United States Patent
Eggleton et al.

(10) Patent No.: US 7,110,646 B2
(45) Date of Patent: Sep. 19, 2006

(54) TUNABLE MICROFLUIDIC OPTICAL FIBER DEVICES AND SYSTEMS

(75) Inventors: Benjamin John Eggleton, Summit, NJ (US); Charles Kerbage, Berkeley Heights, NJ (US); Peter Mach, Berkeley Heights, NJ (US); John A. Rogers, New Providence, NJ (US); Robert Scott Windeler, Annandale, NJ (US)

(73) Assignees: Lucent Technologies Inc., Murray Hill, NJ (US); Fitel USA Corp., DE (US)

( * ) Notice: Subject to any disclaimer, the term of this patent is extended or adjusted under 35 U.S.C. 154(b) by 221 days.

(21) Appl. No.: 10/094,093

(22) Filed: Mar. 8, 2002

(65) Prior Publication Data

US 2003/0169987 A1 Sep. 11, 2003

(51) Int. Cl.
*G06C 1/00* (2006.01)
(52) U.S. Cl. ...................................... 385/123
(58) Field of Classification Search ................ 385/123, 385/124, 125, 126, 127, 37
See application file for complete search history.

(56) References Cited

U.S. PATENT DOCUMENTS

| | | | |
|---|---|---|---|
| 3,670,130 A | 6/1972 | Greenwood | 200/183 |
| 4,030,813 A | 6/1977 | Kohashi et al. | 350/161 S |
| 4,118,270 A | 10/1978 | Pan et al. | 156/659 |
| 4,137,060 A | 1/1979 | Timmermann | 65/31 |
| 4,338,352 A | 7/1982 | Bear et al. | 427/8 |
| 4,406,732 A | 9/1983 | Kayoun | 156/626 |
| 4,569,575 A | 2/1986 | Le Pesant et al. | 350/353 |
| 4,653,847 A | 3/1987 | Berg et al. | 350/96.2 |
| 4,671,609 A | 6/1987 | Khoe et al. | 350/96.18 |
| 4,708,426 A | 11/1987 | Khoe | 350/96.18 |
| 4,867,521 A | 9/1989 | Mallinson | 350/96.18 |
| 4,948,214 A | 8/1990 | Hamblen | 350/413 |
| 5,412,746 A | 5/1995 | Rossberg et al. | 385/48 |
| 5,428,711 A | 6/1995 | Akiyama et al. | 395/25 |
| 5,486,337 A | 1/1996 | Ohkawa | 422/100 |
| 5,518,863 A | 5/1996 | Pawluczyk | 430/321 |
| 5,619,600 A * | 4/1997 | Pohl | 385/15 |
| 5,659,330 A | 8/1997 | Sheridon | 345/84 |
| 6,014,259 A | 1/2000 | Wohlstadter | 359/619 |
| 6,363,089 B1 * | 3/2002 | Fernald et al. | 372/20 |
| 6,369,954 B1 | 4/2002 | Berge et al. | 359/666 |
| 6,538,823 B1 | 3/2003 | Kroupenkine et al. | 359/665 |
| 6,542,682 B1 * | 4/2003 | Cotteverte et al. | 385/125 |
| 6,545,815 B1 | 4/2003 | Kroupenkine et al. | 359/665 |
| 6,545,816 B1 | 4/2003 | Kroupenkine et al. | 359/665 |
| 6,563,985 B1 * | 5/2003 | Yin et al. | 385/37 |
| 6,603,912 B1 * | 8/2003 | Birks et al. | 385/125 |

FOREIGN PATENT DOCUMENTS

DE    196 23 270 A    1/1998

(Continued)

OTHER PUBLICATIONS

U.S. Appl. No. 10/231,614, filed Aug. 30, 2002, Kroupenkine et al.

(Continued)

*Primary Examiner*—Daniel Stcyr

(57) ABSTRACT

A tunable optical fiber device comprises a length of fiber having a core having a certain refractive index; a cladding peripherally surrounding the core with a refractive index less than the refractive index of the core; and at least one hollow region disposed within the cladding in proximity to the core or within the core itself. Fluid (typically liquid) controllably moved within the hollow region modifies the effective index of the fiber and thereby tunes its characteristics.

20 Claims, 8 Drawing Sheets

FOREIGN PATENT DOCUMENTS

FR    2 769 375 A1    4/1999
FR    WO 99/18456    4/1999

OTHER PUBLICATIONS

U.S. Appl. No. 10/139,124, filed May 3, 2002, Kroupenkine et al.
U.S. Appl. No. 10/135,973, filed Apr. 30, 2002, Bao et al.
U.S. Appl. No. 10/637,837, filed Aug. 8, 2003, Davis et al.
U.S. Appl. No. 10/402,046, filed Mar. 28, 2003, Aizenberg et al.
U.S. Appl. No. 10/378,412, filed Mar. 3, 2002, Aizenberg et al.
U.S. Appl. No. 10/096,199, filed Mar. 12, 2002, Chandross et al.
U.S. Appl. No. 10/631,996, filed Jul. 31, 2003, Aizenberg et al.
Washizu, Masao, "Electrostatic Actuation of Liquid Droplets for Microreactor Applications," *IEEE Transactions on Industry Applications*, vol. 34, No. 4, Jul./Aug. 1998, pp. 732-737.
Schilling, Andreas et al., Surface Profiles of Reflow Microlenses Under the Influence of Surface Tension and Gravity, *Opt. Eng.* 39(8) pp. 2171-2176, Society of Photo-Optical Instrumentation Engineers, Aug. 2000.
Danzerbrink, R. et al., "Deposition of Micropatterned Coating Using an Ink-Jet Technique," *Thin Solid Films* 351, pp. 115-118, Elsevier Science S.A. (1999).
Feng, Chuan Liang et al., "Reversible Wettability of Photoresponsive Flourine-Containing Azobenzene Polymer in Langmuir-Blodgett Films," *Langmuir* vol. 17, No. 15, 2001, pp. 4593-4597, American Chemical Society, published on Web Jun. 22, 2001.
Ichimura, Kunihiro et al., "Light-Driven Motion of Liquids on a Photoresponsive Surface," Science, vol. 288, Jun. 2, 2000, pp. 1624-1626.
Commander, L.G. et al., "Variable Focal Length Microlenses," *Optics Communications* 177, Apr. 15, 2000, pp. 157-170.
Aizenberg, J., et al., "Calcitic microlenses as part of the photoreceptor system in brittlestars," *Nature*, vol. 412, pp. 819-822, Aug. 23, 2001.
English language translation of abstract for German Patent Document : DE 19623270 from European Patent Office database, (esp@cenet.com (1998), 1 page.

\* cited by examiner

TUNABLE MICROFLUIDIC OPTICAL FIBER DEVICES AND SYSTEMS

FIELD OF THE INVENTION

This invention relates to optical fiber devices and, in particular, to fiber devices tunable by the controlled movement of microscopic quantities of fluids within the fiber.

BACKGROUND OF THE INVENTION

Optical fibers are useful for many applications in modern communications systems. A typical optical communications system comprises a transmitter of optical signals, a length of transmission optical fiber coupled to the source, and a receiver coupled to the fiber for receiving the signals. One or more amplifying systems may be disposed along the fiber for amplifying the transmitted signal. Filters and attenuators are required in these systems to change the power levels of various signals.

Basically, an optical fiber is a strand of waveguiding glass comprising an inner core having a certain index of refraction and an outer cladding peripherally surrounding the core. The cladding has a lower index of refraction than the core. As long as the refractive index of the core exceeds that of the cladding, a light beam can be guided along the length of the core by total internal reflection. Since the light is confined mostly in the core region, the ability to externally effect propagation behavior of the light is significantly limited. With conventional fibers, to change the propagation behavior of light in the core, one is essentially limited to the application of strain and/or temperature changes to the fiber.

Optical fiber gratings are important elements for controlling light within fibers. A fiber grating typically comprises a length of fiber including a plurality of substantially equally spaced optical grating elements such as index perturbations, slits or grooves. Such gratings include long period gratings and Bragg gratings.

A long period grating couples optical power between two copropagating modes with very low back reflections. It typically comprises a length of optical waveguide wherein the refractive index perturbations are spaced by a periodic distance $\Lambda$ which is large compared to the wavelength $\lambda$ of the transmitted light. In contrast with Bragg gratings, long-period gratings use a periodic spacing $\Lambda$ which is typically at least 10 times larger than the transmitted wavelength, i.e. $\Lambda \geq 10\lambda$. Typically $\Lambda$ is in the range 15–1500 micrometers, and the width of a perturbation is in the range $\frac{1}{5} \Lambda$ to $\frac{4}{5} \Lambda$. In some applications, such as chirped gratings, the spacing $\Lambda$ can vary along the length of the grating. Long-period gratings are particularly usefull in optical communication systems for equalizing amplifier gain at different wavelengths. See, for example, U.S. Pat. No. 5,430,817 issued to A. M. Vengsarkar on Jul. 4, 1995.

A fiber Bragg grating comprises a length of optical fiber including a plurality of perturbations in the index of refraction. These perturbations selectively reflect light of wavelength $\lambda$ equal to twice the spacing $\Lambda'$ between successive perturbations times the effective refractive index, i.e. $\lambda = 2n_{eff}\Lambda'$, where $\lambda$ is the vacuum wavelength and $n_{eff}$ is the effective reactive index of the propagating mode. The remaining wavelengths pass essentially unimpeded. Bragg gratings have found use in a variety of applications including filtering, adding and dropping signal channels, stabilization of semiconductor lasers, reflection of fiber amplifier pump energy, and compensation for waveguide dispersion.

Many potential applications require optical gratings having characteristics which are tunable. A tunable long period grating can provide dynamic gain compensation. Tunable Bragg gratings can permit dynamic control of which wavelength will pass through the grating and which will be reflected or diverted.

As may be appreciated, those concerned with the development of optical communications systems continually search for new components and fiber designs. As optical communications systems become more advanced, there is growing interest in new methods and devices for modulating, filtering, attenuating and switching wavelength channels. The instant invention provides a new structure for a tunable optical fiber devices including tunable fiber gratings.

SUMMARY OF THE INVENTION

In accordance with the invention, a tunable optical fiber device comprises a length of fiber having a core having a certain refractive index; a cladding peripherally surrounding the core with a refractive index less than the refractive index of the core; and at least one hollow region disposed within the cladding in proximity to the core or within the core itself. Fluid (typically liquid) controllably moved within the hollow region modifies the effective index of the fiber and thereby tunes its characteristics.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION OF THE INVENTION

In accordance with the invention, an active optical waveguide device comprises an optical fiber microstructured with one or more hollow internal channels, a movable region of fluid within each channel and an actuator for moving the fluid within the channel to tune the device. The channeled fibers will be referred to herein as "microstructured fibers", the movable regions of fluid will be referred to as microfluidic plugs, and the resulting devices will be called microfluidic fiber devices.

Figure 1:
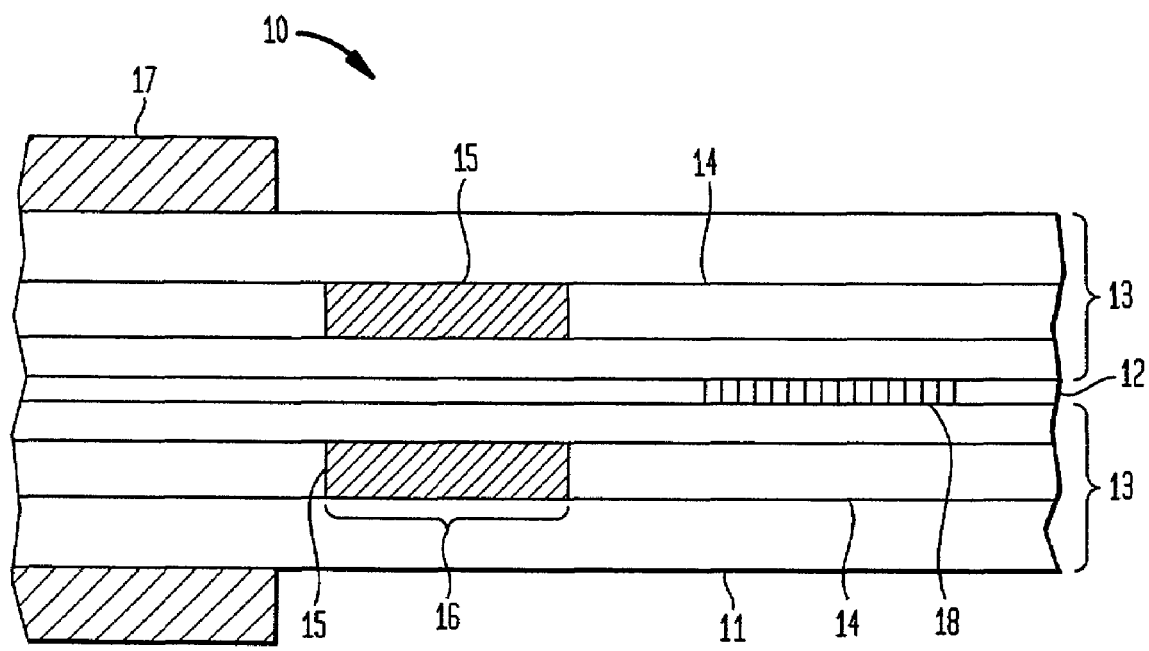
FIG. 1 is a schematic illustration of a microfluidic optical fiber device in accordance with the invention.

Referring to the drawings, FIG. 1 is a schematic illustration of an exemplary microfluidic fiber device in accordance with the invention. The exemplary device 10 comprises a length of microstructured optical fiber 11 including a core 12 having a first index of refraction, a cladding 13 having a second (lower) index of refraction peripherally surrounding the core and one or more hollow channels 14 disposed in the cladding proximate the core or within the core itself. A portion of each channel 14 is filled with a movable fluid 15 having a third index of refraction to form a microfluidic plug 16. An actuator 17, which can be disposed on the surface of the fiber, is provided for moving the fluid 15 along the length of each channel 14 to control the location of the plug 16. If the fluid has an index of refraction different from an unfilled channel 14, movement of the fluid can be used to alter the effective index of the fiber segment to which the plug 16 is moved. Thus movement of the fluid to a fiber segment 18 that is sensitive to changes in the effective index can provide a tunable optical fiber device such as a tunable grating.

Figure 2A:
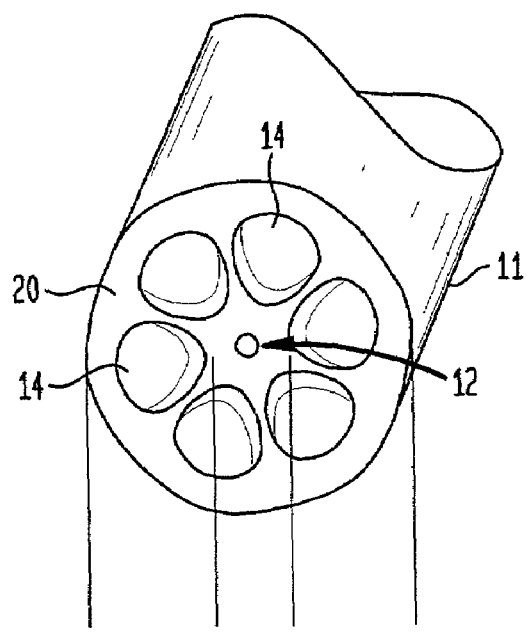
FIGS. 2A and 2B illustrate a microstructured fiber and its index profile.

FIG. 2A shows an exemplary microstructured fiber 11 useful in the device 10 of FIG. 1. The cleaved fiber face 20 reveals six symmetrically distributed hollow channels 14 (air channels) that run along a length of the fiber 11. The channels 14 are sufficiently proximate the core 12 to interact with modes guided by the fiber. The outer diameter of the fiber 11 can be similar to that of a conventional fiber (125 µm). The core 12 supports a single mode that is confined by total internal reflection at the core/cladding interface, and which does not interact with the channels 14. This type of fiber has all of the attractive optical and physical characteristics of high quality, conventional single mode fiber (SMF): low loss, low dispersion, and low polarization dependent loss, plus mechanical flexibility, low cost, and environmental stability. As a specific example, the fiber can have a silica cladding with an outer diameter of about 130 micrometers and a germanium-doped silica core with a diameter of about 8 micrometers. The channels 14 can have a diameter of about 40 micrometers. Such fibers can be purchased from Crystal Fibre, Inc., Birerod, Denmark or made by the process described in U.S. Pat. No. 5,802,236 issued to DiGiovanni et al., which is incorporated herein by reference.

Figure 2B:
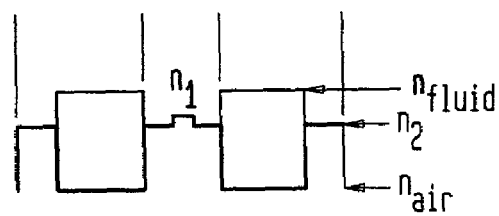

FIG. 2B indicates the refractive index profile of a typical microstructured fiber, where $n_1$, and $n_2$ are the indices of the fiber core and cladding, respectively, and for which $\Delta n = (n_1 - n_2)/n_1 \sim 0.35\%$.

Figure 3:
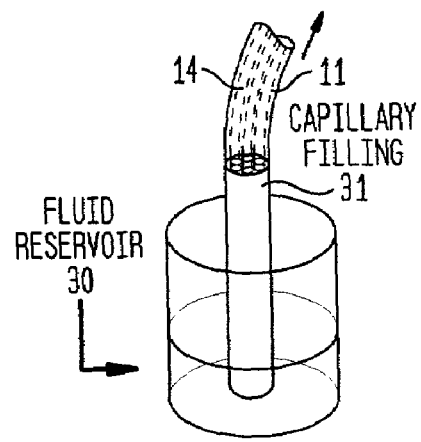
FIG. 3 shows how fluids can be introduced into channels of a microstructured fiber.

FIG. 3 illustrates how the liquids can be introduced into the channels 14 of a microstructured fiber. Immersing a cleaved end of microstructured fiber 11 into a fluid reservoir 30 leads to capillary filling of the channels 14. Once the desired fluid plug length is achieved, filling can be terminated by removing the fiber 11 from the reservoir. The resulting fluid plugs 31 can be positioned to a desired location along the fiber, either by suction or by allowing the plugs 31 to drain through the channels under the action of gravity.

Actuator 17 of FIG. 1 can be any one of a variety of components for controllably moving fluid with the channels 14. For example, a magnetic actuator can be used to move a magnetic fluid, an electrostatic actuator can be used to move a polarizable fluid, and pressurized gas or gas heated by a thermal actuator can be used to drive a liquid. A preferred actuator 17 for moving the fluid is an on-fiber heater in conjunction with a sealed fiber end. Heated gas drives the plug to compress unheated gas against the sealed end 40. The end can be sealed by fusion splicing with a standard fiber.

Figure 4:
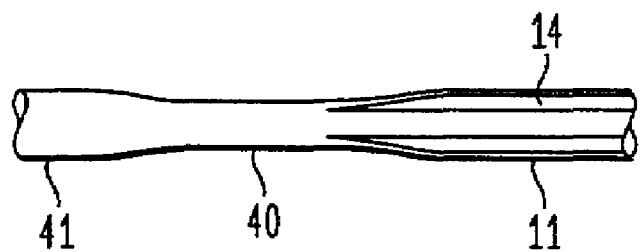
FIG. 4 is an optical micrograph depicting a segment of microstructured fiber spliced to conventional fiber.

FIG. 4 displays an optical micrograph of a fusion spliced sealed end. The fusion splice causes the channels 14 in the microstructured fiber 11 to collapse and seal near the junction with the standard fiber 41. (The fluid plugs are typically positioned more than several centimeters away from the end of the fiber and are not effected by the splicing.) This collapse and fusion bonding provides both a hermetic seal and a robust mechanical joint; it also traps the imbibed fluid plugs between two segments of air-filled channels 14. Pressurizing one of these two air segments (for example, by increasing its temperature) drives the plugs to a new equilibrium position along the fiber. If the pressurizing mechanism is deactivated (for example, by allowing the heated air to cool), then back pressure in the "opposing" air segment drives the fluid to its original equilibrium position. This type of microfluidic pumping provides a simple and robust way to control the positions of the fluids along the fiber. Pumping techniques can also be combined with methods to change the intrinsic optical properties of the fluids (e.g. their refractive index) to control the transmission characteristics of the fiber. For example, the fluid can have an electrically adjustable index (e.g. electrooptic crystal material) or a magnetically adjustable index (ferrofluidic material). Alternatively, the fluid can have an optical absorption different from the surrounding fiber material (e.g. a strong absorption fluid).

Figure 5:
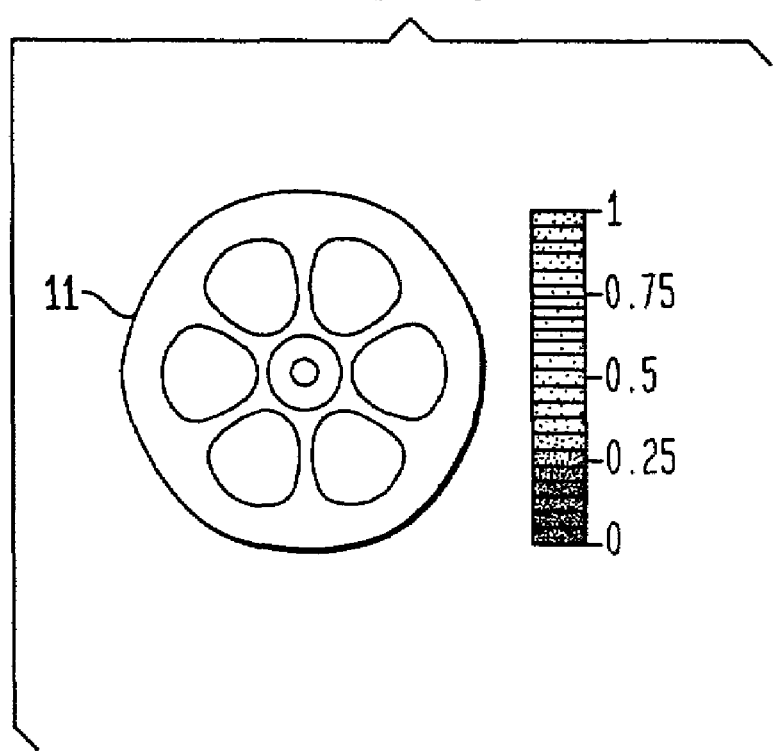
FIG. 5 illustrates typical core mode intensity distribution within a microstructured fiber.

In operation, light in the core which does not interact with the channels, is coupled to modes whose intensity distribution has significant channel overlap. The fluids can then dramatically affect transmission by altering portions of the refractive index profile that are relevant to these modes. FIG. 5 illustrates the core mode intensity distribution in the microstructured fiber 11. There are at least two possible schemes for bringing the initial mode field into interaction with the channels. One approach uses a long-period index grating (LPG) in the core of the fiber. This type of grating is a few centimeters long and consists of a periodic modulation of the core index, with a period of a few hundred microns. An LPG induces phased-matched coupling of the core mode to a forward-propagating mode that involves significant intensity in the cladding. Light that couples to this cladding mode does not return to the core mode at points beyond the grating. As a result, the LPG-induced coupling creates a narrowband loss feature in the spectrum of transmitted light. The central position, $\lambda_{res}$, of this resonance is governed by the phase-matching condition:

$$\lambda_{res} = (n_{core} - n_{clad})\Lambda \qquad (1)$$

where $n_{core}$ is the effective core mode index, $n_{clad}$ is the effective cladding mode index, and $\Lambda$ is the period of rating index modulation. The strength of the coupling, $\Gamma_{LPG}$, which determines the depth of the associated resonance loss, is related to the length of the grating and the magnitude of the index modulation associated with it.

If the fiber channels contain a fluid whose index is below that of silica, then the cladding mode is strictly guided by total internal reflection: it is completely confined to the central region of the fiber which is bounded by the interface between the silica and the microfluidic channels.

Figure 6:
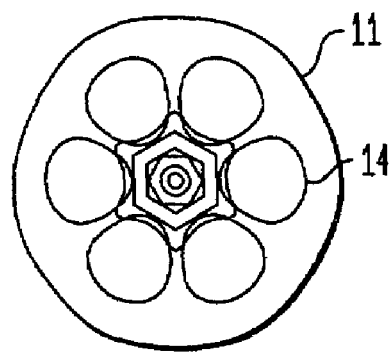
FIG. 6 illustrates an $LP_{02}$ cladding mode in an exemplary fiber with low index fluid-filled channels.

As an example, FIG. 6 shows the relevant cladding mode ($LP_{02}$) when the fiber channels 14 are filled by material with $n_{fluid}$=1.3. Due to overlap of the evanescent part of this mode with the channels, the index of the fluid influences $n_{clad}$. Tuning the index of the fluid therefore changes the resonance position $\lambda_{res}$ according to Eq. (1).

Figure 7:
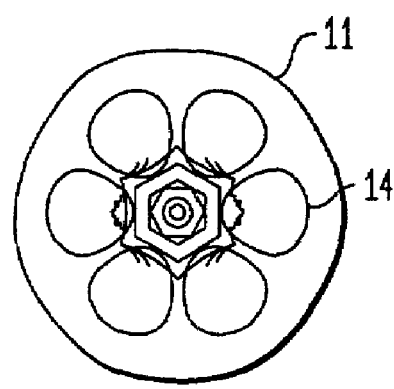
FIG. 7 shows an $LP_{02}$ cladding mode in an exemplary fiber with high index fluid-filled channels.

As another example, if $n_{fluid}>n_{silica}$, then the cladding mode is no longer confined by total internal reflection. Instead, it is only weakly guided by Fresnel reflections at the silica/fluid boundary. FIG. 7 gives the intensity distribution for an $LP_{02}$ mode that has propagated through 1 cm of fiber when $n_{fluid}$=1.8. A comparison with FIG. 6 reveals a significant reduction in the total integrated intensity, caused by light loss to the high index channels. In cases such as this one, where the cladding mode is leaky instead of strictly guided, the LPG-mediated core-to-cladding mode coupling is inhibited. Adjusting the degree to which a high-index fluid plug extends over the grating region therefore continuously tunes the strength, $\Gamma_{LPG}$, of the LPG-generated resonance.

A second approach to achieving tunability in a microfluidic system uses a length of fiber whose diameter gradually decreases to a small value and then increases back again to its original dimension. This tapered structure, which can be fabricated by a heating and pulling process, preserves the refractive index profile and internal structure of the fiber. As the core mode propagates into the narrow region of the fiber, it spreads adiabatically into the silica cladding. This "expanded" mode is confined to the central region of the fiber by the silica/air channel interfaces.

Figure 8:
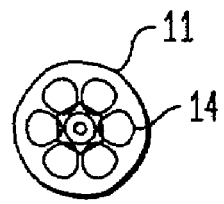
FIG. 8 illustrates the intensity field produced by propagation through a low index fluid-filled tapered region.

FIG. 8 shows the intensity field that results after core mode light propagates through a tapered region where the fiber diameter decreases from 130 to 50 μm over a distance of ~1 cm. If the fiber channels contain a low index material ($n_{fluid}<n_{silica}$), then this expanded mode travels without loss through the narrowed fiber. It adiabatically couples back the original core mode with very low loss (~0.5 dB) as the fiber diameter increases back to its original value. If, on the other hand, the channels contain a high index ($n_{fluid}>n_{silica}$) material, then the light couples into the channels in the tapered region.

Figure 9:
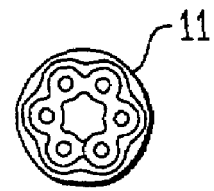
FIG. 9 shows the intensity field produced by propagation through a high index fluid-filled tapered region.

FIG. 9 shows the intensity distribution for light that has traveled into the narrowed region of a fiber whose channels contain a fluid with $n_{fluid}$=1.8. In this case, light does not couple back into the core, even as the fiber diameter increases back to its original value. The net effect of this high index fluid, therefore, is to cause a broadband attenuation of the light that propagates through the fiber taper.

The approaches described above suggest at least two device arrangements in which microfluidics and microstructured fiber can be exploited to yield fiber systems with versatile tuning capabilities. The first provides wavelength and depth tuning of a grating such as the narrow-band attenuation feature associated with an LPG: the degree of spatial overlap of a high index fluid plug ($n_{fluid}>n_{silica}$) with the grating region, which is controlled by pumping the fluids, adjusts the attenuation depth; an adjacent low index fluid ($n_{fluid}<n_{silica}$), which is tuned by changing its temperature (i.e. exploiting $dn_{fluid}/dT$), controls the resonance wavelength. In a second system, a tapered microstructured fiber containing a high index fluid plug acts as a broadband tunable attenuator, with wide dynamic range: Overlap of the high index plug with the tapered region is adjusted by pumping the fluid and produces significant losses in transmission.

In typical application within an optical fiber communication system, the inventive microfluidic device is optically coupled along a length of the fiber transmission path between a transmitter and a receiver to provide a controllable level of attenuation. The device can, for example, provide sufficient attenuation to switch off the line or a branch thereof. Alternatively, it can provide compensating attenuatuation to control the transmitted power level in the line or branch. One important such application is to compensate optical amplifiers, controlling the device attenuation by feedback signals indicative of the amplified power or the gain of the amplifier.

Figure 10:
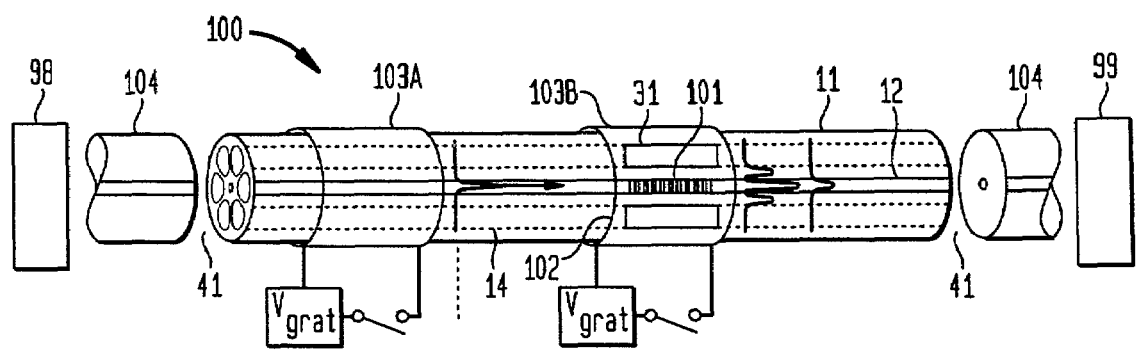
FIG. 10 schematically illustrates an optical communication system employing an exemplary tunable device in accordance with the invention.

FIG. 10 provides a schematic illustration of an optical communication system employing an exemplary tunable device 100 in accordance with the invention. The device 100 is coupled to segments of a transmission fiber (or branch) 104 between a transmitter 98 and a receiver 99. The device 100 uses a two-component microfluidic arrangement in a microstructured fiber 11 with an LPG 101 written in its core 12. The fluid plug 31 comprises adjacent segments of low index and high index immiscible liquids imbibed by capillary action into the fiber's channels 14. The fluids are pulled in one after another with no intervening air gap. This dual-fluid plug is allowed to drain under gravity so that the low index fluid fully overlaps the grating region 101, and the interface 102 between the fluids lies at the edge of the LPG 101. Splices at both ends to standard single mode fibers 104 create channel seals and the low loss optical coupling described previously. Independent thin film resistive microheaters 103A, 103B control the temperature of the grating region and the air channels on one side of the dual-fluid plug. The voltage, $V_{grat}$, applied to the grating heater sets the temperature, $T_{grat}$, of fluid residing in the LPG region. $V_{pump}$ controls the temperature of the sealed air channels to the left of the fluid plug; thermal expansion of this air pumps the plug to the right, thereby increasing the overlap of the high-index fluid with the fiber grating. In this manner, $V_{grat}$ controls $\lambda_{res}$ and $V_{pump}$ controls $\Gamma_{LPG}$, in a nearly independent fashion.

As a specific embodiment, the LPG can be 4 cm long with a spacing Λ=500 micrometers. The low index fluid can be fluoroether (n=1.28), and the high index fluid can be methylene iodide (n=1.73). The fluid plugs can be 4.5 cm long segments. Grating heater 103B can be 8 cm long and channel heater 103A can be 15 cm. The microstructured fiber segment can have a length of about 70 cm.

Figure 11:
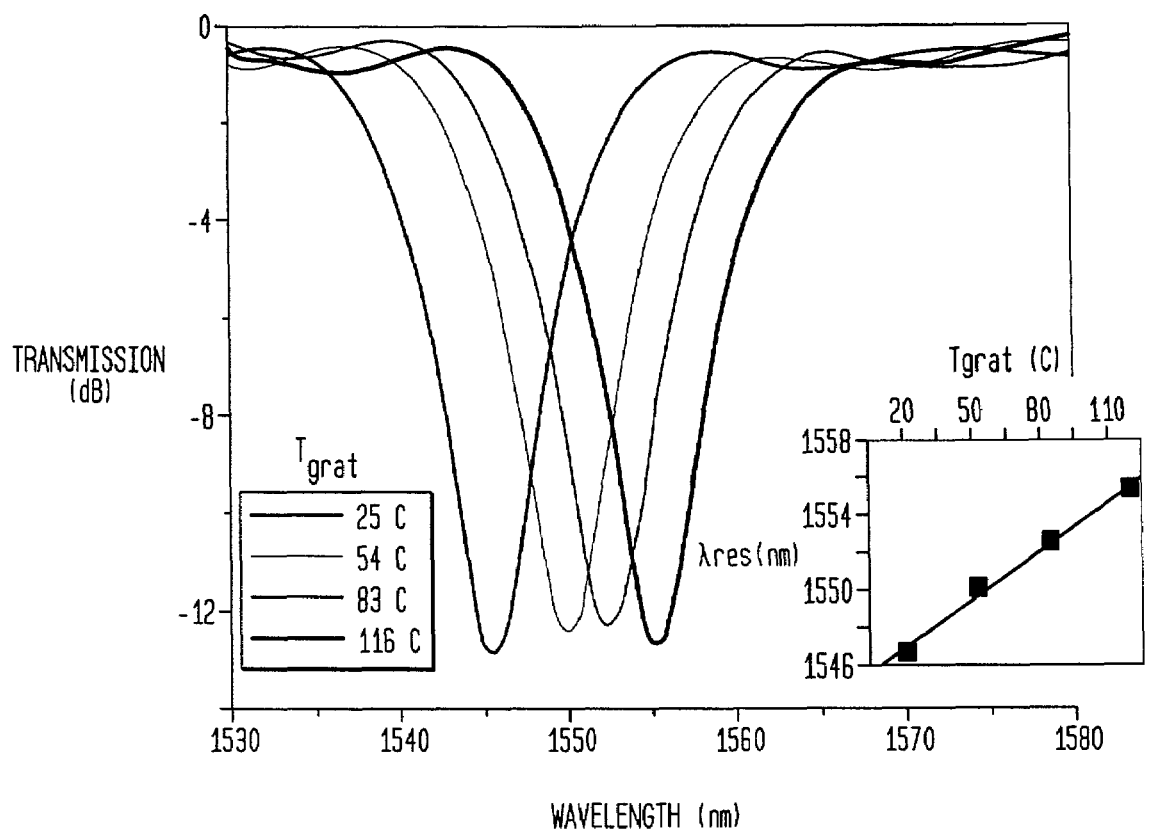
FIGS. 11, 12 and 13 show transmission spectra of the FIG. 10 device.

This system was characterized by measuring its spectral transmission characteristics as a function of $V_{grat}$ and $V_{pump}$. FIG. 11 displays spectra as a function of $V_{grat}$ when $V_{pump}$=0 (i.e. the low index fluid fully overlaps the grating). The data show that the LPG attenuation feature (i.e. the dip in this figure) shifts uniformly with $V_{grat}$. The inset shows $\lambda_{res}$ tunability of ~0.10 nm/° C., or ~0.014 nm per mW of power to the grating microheater. This tunability corresponds well to expected changes in $n_{clad}$ that result from the temperature sensitivity of the index of the fluid (which is approx. 30 times larger than the temperature sensitivity of the refractive index of the silica cladding, and 300 times larger than that of the air).

Figure 12:
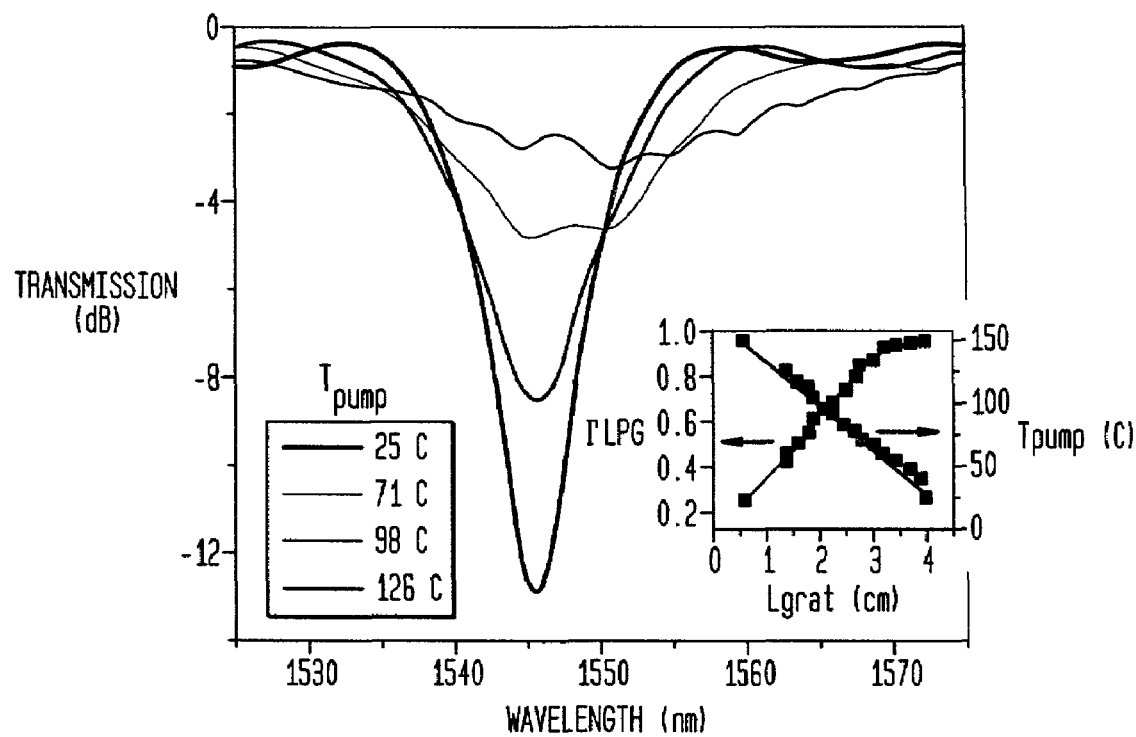

FIG. 12 illustrates, for the same device, spectra as a function of $V_{pump}$ when $V_{grat}$=0 Increasing $V_{pump}$ drives the high-index fluid to the right, and increases its degree of overlap with the long-period grating. The inset shows how $T_{pump}$ determines the effective length of the grating, $L_{grat}$, which we define as the full length of the grating ($L_o$) minus the length that overlaps with the high-index fluid. The line associated with these data represents a simple computation that uses ideal gas behavior to predict the position of the plug:

$$L_{grat}(T_{pump}) = L_o - L_{comp}\{1 - T_o L_{total}/(\alpha T_{pump} L_{pump} + T_o (L_{total} - \alpha L_{pump}))\} \quad (2)$$

where $T_o$ is the ambient temperature; $L_{total}$ is the total length of unfilled channels; $L_{pump}$ is the length of the pump heater; $\alpha(\sim 0.95)$ is a parameter that approximates the effects of axial thermal diffusion; and $L_{comp}$ is the air channel length beyond the fluid plug on the side of the fiber opposite to the pump heater. The LPG resonance strength, $\Gamma_{LPG}$, decreases with this pumping due to the inhibited core-cladding coupling as discussed previously. FIG. 12 shows $\Gamma_{LPG}$, versus $L_{grat}$.

Figure 13:
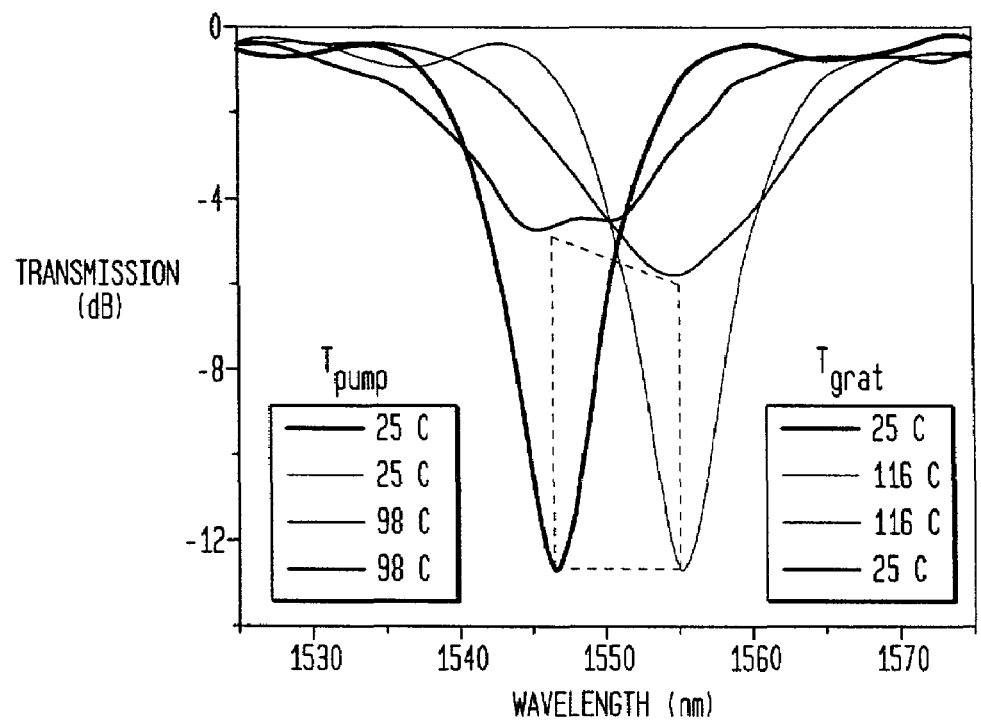

FIG. 13 illustrates independent tuning of both the LPG resonance wavelength and depth in this dual-fluid microstructured fiber system. The plot shows four spectra (A, B, C, D) collected in a sequence of increasing and decreasing $V_{pump}$ and $V_{grat}$. After a complete cycle, the spectrum returns to its original state to within 0.5 dB in depth and 1 nm in wavelength. These flexible tuning characteristics illustrate the versatility of the microfluidic approach. Arrangements similar to FIG. 10 can be used to tune fiber Bragg gratings.

Figure 14A:
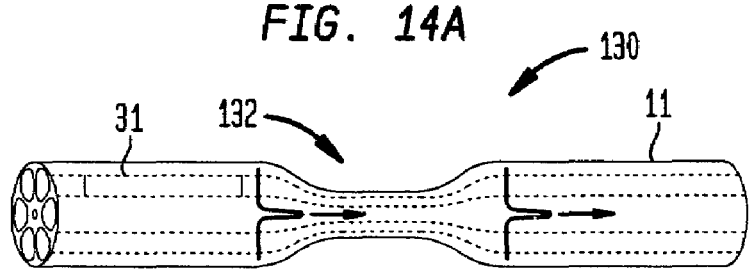
FIGS. 14A and 14B illustrate a second exemplary tunable grating device with fluid plugs in two different locations.
Figure 14B:
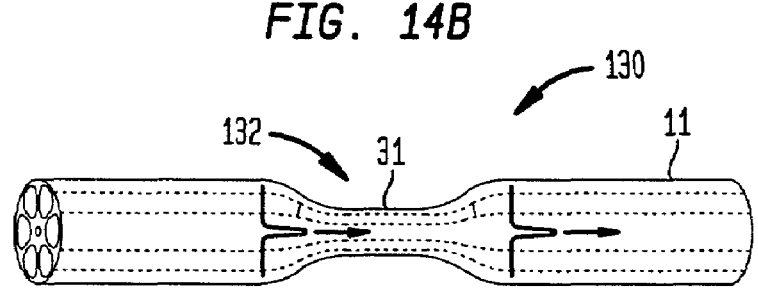

FIGS. 14A and 14B show a second type of microfluidic optic system. This device 130 consists of a segment of microstructured fiber 11 gradually tapered down to a narrow diameter region 132. The fiber 11 was filled by capillary action with high-index fluid; the plug 31 was positioned using a vacuum so that its leading edge coincided with the onset of the taper 132 as shown in FIG. 14A. Splicing this tapered fiber to standard SMF provides an air-tight seal and efficient coupling of light. Increasing the temperature of the air channels on the left drives the microfluidic plug 31 into the tapered channels as shown in FIG. 14B. The high-index fluid in the tapered region causes light to couple irreversibly into the channels. In this state, the structure does not transmit. By contrast, when the fluid is not present in the taper, there is very little propagation loss.

Figure 15:
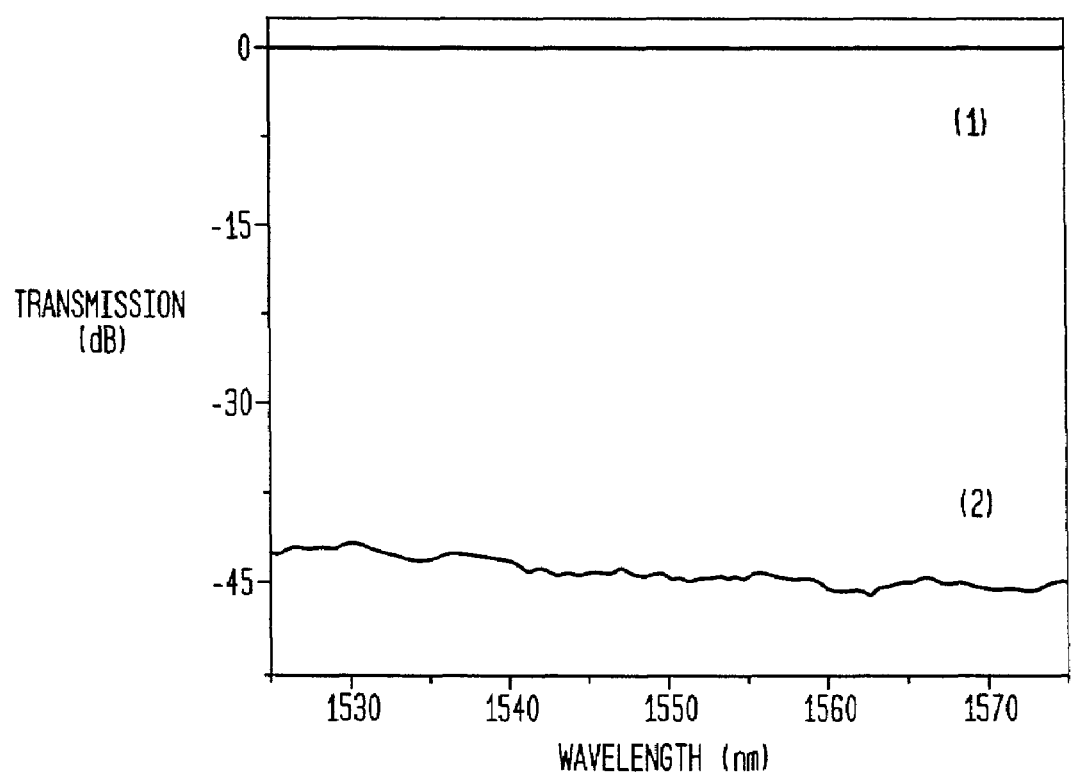
FIG. 15 graphically displays the transmission spectra of the FIGS. 14A and 14B device.

FIG. 15 graphically illustrates the transmission characteristics of an exemplary device of the type shown in FIGS. 14A and 14B. Curve 1 shows the transmission attenuation for the FIG. 14A condition. Curve 2 shows the attenuation for the FIG. 14B condition.

As a specific example, a 40 cm segment of fiber 11 can be tapered to a diameter of about 50 micrometers over a 1 cm length (the narrowed region was 1 cm long). The high index fluid can have an index of 1.73 and form a plug length of about 3 cm. FIG. 15 illustrates the characteristics of the device. Traces (1) and (2) correspond with the two different fluid plug positions drawn in FIG. 14. Pumping the fluid into the taper creates a broadband attenuation of $\geq 40$ dB.

Figure 16:
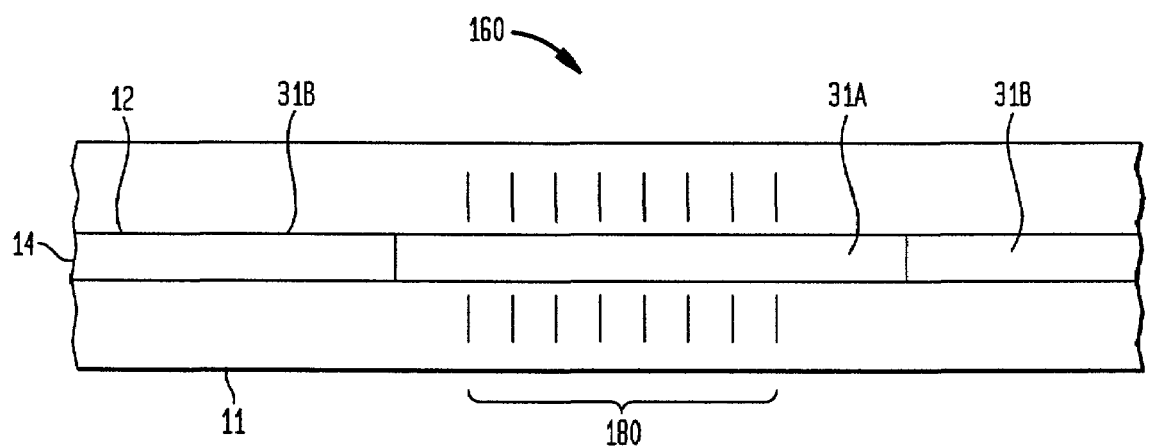
FIG. 16 shows a third exemplary tunable grating device using a microfluidic channel within the core region.

As an alternative to channels proximate the core, one may also employ channels within the core region of a fiber. One or more fluid segments movable within the channel can change the local effective index. FIG. 16 is a schematic illustration of an exemplary microfluidic optical fiber device 160 wherein a microfluid channel 14 is disposed within the core region 12 of a fiber 11. A plurality of immiscible fluid segments 31A and 31B can be moved by an actuator (not shown) within channel 14 to change the local effective index of the core. Here an optical fiber grating 180 is written into the cladding and segments 31A and 31B have respectively different indices, each preferably greater than that of the cladding.

In operation, the exponential tail of core mode light penetrates into the cladding by a characteristic length:

$$\delta \sim \lambda/(2\pi\sqrt{n_{eff}^2 - n_{clad}^2}),$$

where $\lambda$ is the light wavelength, $n_{eff}$ is the effective core mode index and $n_{clad}$ is the index of the cladding. The coupling between the core mode and the grating depends on whether segment 31A or 31B overlaps the grating region, and the device is thus tunable.

The microfluidic fiber optic systems described here combine all of the advantages of conventional fiber with tuning capabilities that in the past could only be achieved with bulk optics, microelectromechanical systems or planar waveguide devices. Technical specifications (tuning range, operating voltages, power consumption, switching times, polarization insensitivity, non-mechanical operation) of these devices make them attractive for important network applications.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. A tunable optical fiber device comprising:
    a length of optical fiber comprising a core region having a first index of refraction peripherally surrounded by a cladding having a second index of refraction less than the core, the fiber including at least one longitudinally extending channel parallel to and proximate the core or within the core;
    fluid, having a third index of refraction, contained within the channel and forming a movable plug; and
    an actuator for controllably moving the movable plug of fluid for controllably changing the effective index of refraction of the fiber in the region to which or from which the fluid is moved.

2. The device of claim 1 wherein the channel is within the cladding proximate to the core.

3. The device of claim 1 wherein the channel is within the core region.

4. The device of claim 1 wherein the length of optical fiber comprises an optical fiber grating.

5. The device of claim 1 wherein the length of optical fiber comprises a long period grating.

6. The device of claim 1 wherein the length of optical fiber comprises a Bragg grating.

7. The device of claim 1 wherein the length of optical fiber comprises a tapered region.

8. The device of claim 7 wherein the tapered region comprises an adiabatically tapered region.

9. The device of claim 1 wherein the length of fiber comprises an end where the channel is sealed.

10. The device of claim 9 wherein the end where the channel is sealed comprises a fusion splice.

11. The device of claim 1 wherein the actuator comprises a heater.

12. The device of claim 1 wherein the movable region of fluid comprises a liquid.

13. The device of claim 12 wherein the tunable fiber device provides controllable attenuation switching.

14. The device of claim 1 wherein the movable plug of fluid comprises a plurality of immiscable fluids.

15. The device of claim 1 wherein at least one of the fluids in the movable plug of fluid has an index of refraction greater than that of the cladding.

16. The device of claim 1 wherein at least one of the fluids in the movable plug of fluid has an index of refraction less than that of the cladding.

17. The device of claim 1 wherein at least one of the fluids in the movable plug of fluid has a thermally, electrically or magnetically adjustable refractive index.

18. The device of claim 1 wherein at least one of the fluids in the movable plug of fluid has an optical absorption different from the surrounding material of fiber.

19. The device of claim 1 wherein the system further comprises an optical amplifier and the tunable fiber device compensates the gain of the amplifier.

20. An optical communication system comprising an optical transmitter, a length of optical transmission fiber and an optical receiver, the system further comprising a tunable optical fiber device including:

a length of optical fiber comprising a core region having a first index of refraction peripherally surrounded by a cladding having a second index of refraction less than the core, the fiber including at least one longitudinally extending channel parallel to and proximate the core or within the core;

fluid, having a third index of refraction, contained within the channel and forming a movable plug; and an actuator for controllably moving the movable plug of fluid for controllably changing the effective index of refraction of the fiber in the region to which or from which the fluid is moved.

* * * * *